United States Patent
Young

(10) Patent No.: US 10,839,972 B2
(45) Date of Patent: Nov. 17, 2020

(54) HIGH RESOLUTION X-RAY IMAGING SYSTEM

(71) Applicant: Joseph T. Young, Port Saint Lucie, FL (US)

(72) Inventor: Joseph T. Young, Port Saint Lucie, FL (US)

(73) Assignee: Joseph T. Young, Port Saint Lucie, FL (US)

( * ) Notice: Subject to any disclaimer, the term of this patent is extended or adjusted under 35 U.S.C. 154(b) by 51 days.

(21) Appl. No.: 15/920,928

(22) Filed: Mar. 14, 2018

(65) Prior Publication Data

US 2018/0277275 A1    Sep. 27, 2018

Related U.S. Application Data

(60) Provisional application No. 62/471,078, filed on Mar. 14, 2017.

(51) Int. Cl.
| | | |
|---|---|---|
| *G01N 23/02* | (2006.01) | |
| *G21K 1/02* | (2006.01) | |
| *G01N 23/083* | (2018.01) | |
| *G21F 3/00* | (2006.01) | |
| *G21K 1/10* | (2006.01) | |

(52) U.S. Cl.
CPC ............. *G21K 1/02* (2013.01); *G01N 23/083* (2013.01); *G21F 3/00* (2013.01); *G21K 1/10* (2013.01); *G01N 2223/313* (2013.01); *G01N 2223/317* (2013.01)

(58) Field of Classification Search
CPC ...... G21K 1/06; G03F 1/22; G01N 2223/635; G01N 2223/076; G01N 23/223; G01N 23/2209; G01N 23/22
See application file for complete search history.

(56) References Cited

U.S. PATENT DOCUMENTS

| | | | |
|---|---|---|---|
| 5,118,181 A * | 6/1992 | Yifrach | G01N 21/87 250/461.1 |
| 5,424,186 A * | 6/1995 | Fodor | B01J 19/0046 435/49 |
| 6,015,976 A | 1/2000 | Hatakeyama et al. | |
| 2006/0008707 A1 | 1/2006 | Watanabe et al. | |
| 2008/0224198 A1 | 9/2008 | Fujii et al. | |
| 2010/0086104 A1* | 4/2010 | Michaelsen | G21K 1/04 378/71 |

(Continued)

FOREIGN PATENT DOCUMENTS

| | | |
|---|---|---|
| DE | 102008013511 | 9/2008 |
| JP | 2000121583 | 4/2000 |

(Continued)

*Primary Examiner* — David P Porta
*Assistant Examiner* — Mamadou Faye
(74) *Attorney, Agent, or Firm* — Meunier Carlin & Curfman LLC

(57) ABSTRACT

A masking apparatus surrounds a specimen and eliminates the presence of voids and gaps between a specimen and a radiation sensitive imaging surface. Voids and gaps allow radiation to become trapped or diffracted therein and lead to noise in the resulting image. A system of radiological imaging associates both a filter and a masking assembly to a specimen for an optimal radiation exposure that permeates the specimen to an imaging array there under.

16 Claims, 6 Drawing Sheets

(56) References Cited

U.S. PATENT DOCUMENTS

2014/0017603 A1     1/2014   Mori

FOREIGN PATENT DOCUMENTS

| JP | 2004093368 | 3/2004 |
|---|---|---|
| JP | 3526018 | 5/2004 |
| JP | 2010257856 | 11/2010 |
| WO | 2004003664 | 1/2004 |
| WO | 2012128323 | 7/2014 |

* cited by examiner

HIGH RESOLUTION X-RAY IMAGING SYSTEM

CROSS REFERENCE TO RELATED APPLICATIONS

This application claims priority to and incorporates entirely by reference U.S. Provisional Patent Application Ser. No. 62/471,078 entitled High Resolution X-Ray Imaging System and filed on Mar. 14, 2017.

FIELD OF THE INVENTION

A method, system, and apparatus for imaging with radiation technology by masking regions of the specimen with radiation blocking materials in conjunction with application of a radiation filter between the specimen and the source of radiation.

BACKGROUND

Current inspection equipment, particularly in the medical environment, takes a "bottom-up" approach in applying energy levels for radiation that is exposed onto a specimen for imaging. Accordingly, the specimen is exposed to wide ranges of radiation power levels before the proper setting is achieved, and those instances of radiation impact the quality of the image. In certain industrial applications, the opposite arrangement of starting the testing with the highest levels of radiation cause the same problems. Incident radiation that is not beneficial to the imaging process is directed onto the specimen and the imaging surface, causing not only wear on the imaging surfaces but also artifacts on the resulting image. Lower doses can be achieved while maintaining the proper level of sensitivity if the incident radiation on the specimen is used only for imaging without the extraneous rays causing problems.

A need exists in the art of radiological imaging for tapping into potential radiology systems using a combination of radiation filtering at the source and radiation masking at the specimen to better utilize much lower levels of radiation relative to the area-of-interest. The lower level radiation translates to longer-lived imaging panels without sacrificing image quality.

The benefits of exposing specimens (whether live or inanimate) to lower levels of radiation are clearly found in lower incidents of health conditions related to radiation exposure as well as lower costs in radiological equipment that lasts longer.

Prior art embodiments that use shielding constructions to protect a specimen during imaging do not take into account the inevitable presence of extraneous and uncontrolled presence of radiation about the specimen. This uncontrolled radiation may take on a variety of wave magnitudes and frequency spectra, either from the source radiation source or by structural attenuation at the specimen, and standard imaging operations occur with no real check on undesirable radiation waves having an impact on the underlying specimen or imaging. Most shielding in use up to this point includes sheet construction housings that are relatively thin in comparison to the shielding disclosed herein, which has a thickness that facilitates the purposes of this disclosure.

BRIEF SUMMARY OF THE DISCLOSURE

In one embodiment of this disclosure, a masking assembly at least partially masks a specimen that is subject to radiation imaging with sections of radiation blocking material connected to define a specimen holding frame that is configured to be positioned onto an imaging surface. The sections of radiation blocking material further define an interior region that is so dimensioned to receive exterior contours of the specimen against internal faces of the holding frame with at least a portion of the specimen visible to the imaging surface.

In another embodiment, a system for imaging a specimen with radiation includes a source of radiation to be directed to the specimen and a filter between the source of radiation and the specimen to attenuate the radiation to a preferred power and wavelength. The specimen is positioned within a masking assembly for partially masking the specimen from imaging radiation directed thereto. The masking assembly has sections of radiation blocking material connected to define a specimen holding frame configured to be positioned onto an imaging surface. The sections of radiation blocking material further define an interior region that is so dimensioned to receive exterior contours of the specimen against internal faces of the holding frame with at least a portion of the specimen visible to the imaging surface.

In yet another embodiment, a method of masking a specimen for radiation imaging includes attaching sections of radiation blocking material to one another such that the connected sections define a specimen holding frame configured to hold a specimen and configured to position a specimen within a line of sight of an imaging surface proximate the specimen holding frame. Arranging the sections of radiation blocking material may further define an interior region that is so dimensioned to receive exterior contours of a specimen against internal faces of the holding frame with at least a portion of the specimen visible through the imaging window.

DETAILED DESCRIPTION

Embodiments of this disclosure use terms that are not intended to be limiting of the products, methods, or systems described. For example, when this disclosure refers to an imaging surface, that piece of equipment may include peripheral electronics that provide imaging functionality to the imaging surface. The imaging surface may include any portion of an imaging apparatus used to provide a line of sight from an electronic imaging array that is sensitive to radiation exposure and has appropriate computerized hardware to produce an image, particularly when a specimen as shown is placed within that line of sight for imaging. Accordingly, this disclosure is not limited to any particular shape or size for imaging surfaces, and the position of the imaging surface relative to a specimen may include any relative positions that fulfill the goal of radiation imaging of the specimen. In this sense, when the disclosure refers to a specimen being "on" an imaging surface, that is not limited to any one orientation, physical proximity or relative position between the imaging surface and the specimen. Being on an imaging surface is a broad phrase to express that a specimen is within a line of sight of a digital imaging apparatus via an imaging surface.

Figure 1:
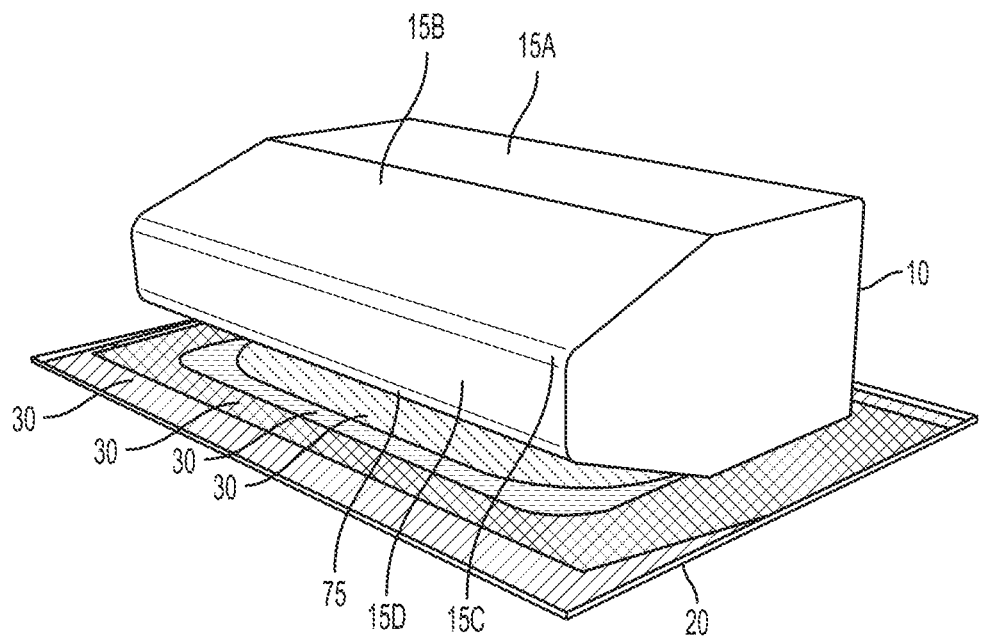
FIG. 1 is a prior art view of a specimen exposed to radiation for imaging purposes without any masking around the specimen.
Figure 2:
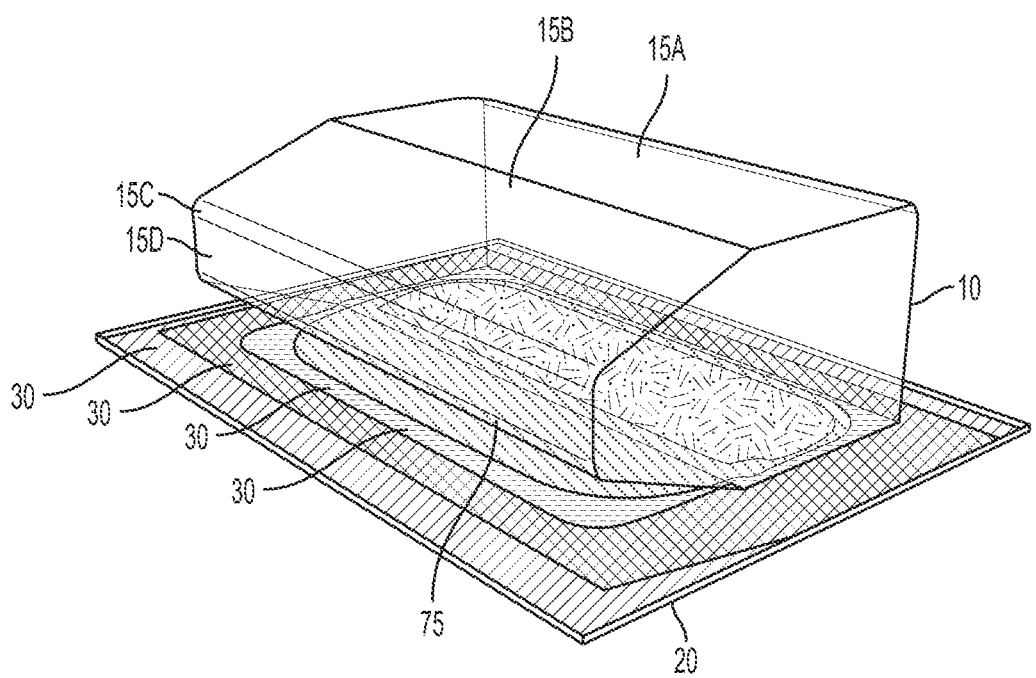
FIG. 2 is a prior art three dimensional model of an image of the specimen of FIG. 1 showing the intensity of radiation used for imaging.
Figure 3:
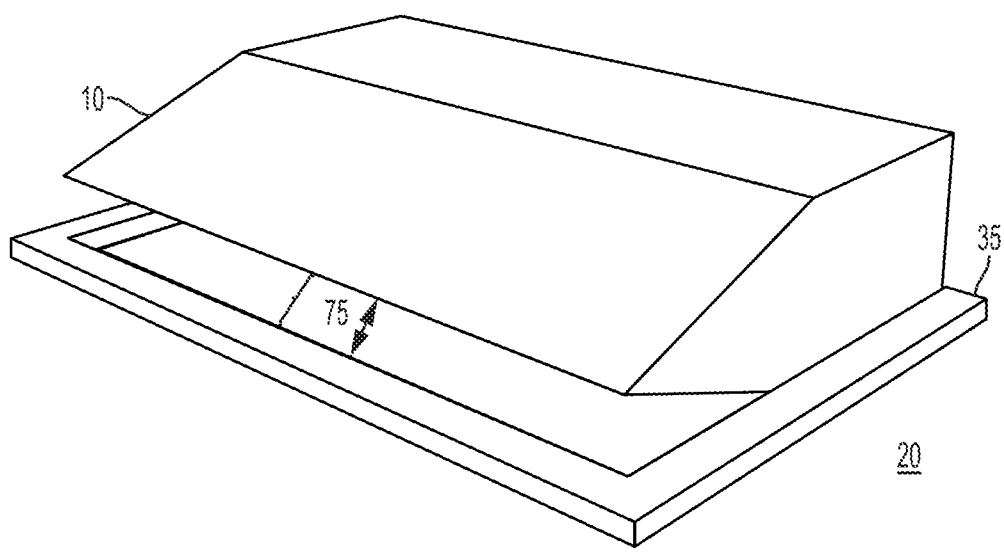
FIG. 3 is a prior art masking protocol that surrounds only the outer perimeter of a specimen.

FIGS. 1-3 illustrate an ongoing problem in the field of radiography used to provide innumerable images of specimens for the medical industry (i.e., diagnostic or interventional radiology) as well as industrial applications (quality testing for structural integrity of components, dimensional analysis for specimens, fault tolerances in manufacturing processes, just to name a few). The prior art FIGS. 1 and 2 show a specimen (10) that has exterior contours defined by various surfaces (15A, 15B, 15C, 15D) that connect to form the exterior of the specimen, giving the specimen a defined profile from various viewing angles. Two problems arise in conjunction with specimens (10) that are simply placed on or within any line of sight of an imaging surface (20), especially when all areas of the specimen surface are not flush with the imaging surface. As shown in FIGS. 1 and 2, when the exterior contours of a specimen are not flush with the imaging surface, there are voids (75) defined between at least one exterior portion of the specimen (10) and the imaging surface (20). These voids (75) provide regions in which various rays of radiation at diverse frequencies can traverse the specimen surface and become trapped in the void (75). These trapped radiation signals (i.e., waves) tend to be reflected and attenuated by various surfaces such that scattered radiation may "bounce around" within the void, causing over-exposure on the imaging surface (20), and an unusable portion of the image results in areas related to the void (75). FIGS. 1 and 2 depict the over-exposed areas of the imaging surface in terms of radiation intensities (30). The darkest areas show a sharp increase in radiation intensity, and thus over-exposure, in regions associated with the void (75) under a front region of the specimen. As set forth in FIG. 3, a simple masking frame (35) around an outer perimeter of the overall specimen profile does little to alleviate the issue.

Figure 4:
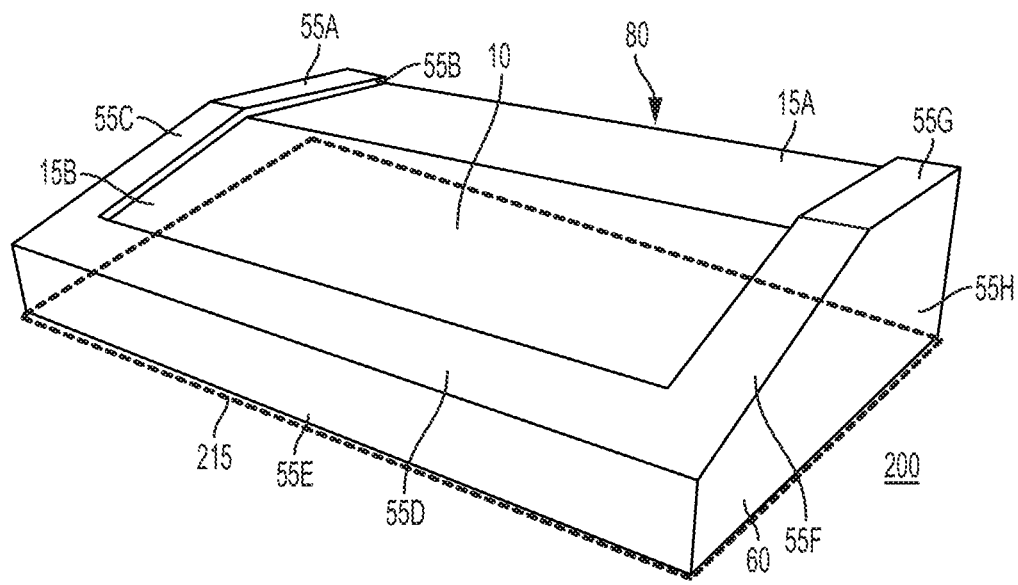
FIG. 4 is a masking assembly surrounding a specimen as shown herein.
Figure 5:
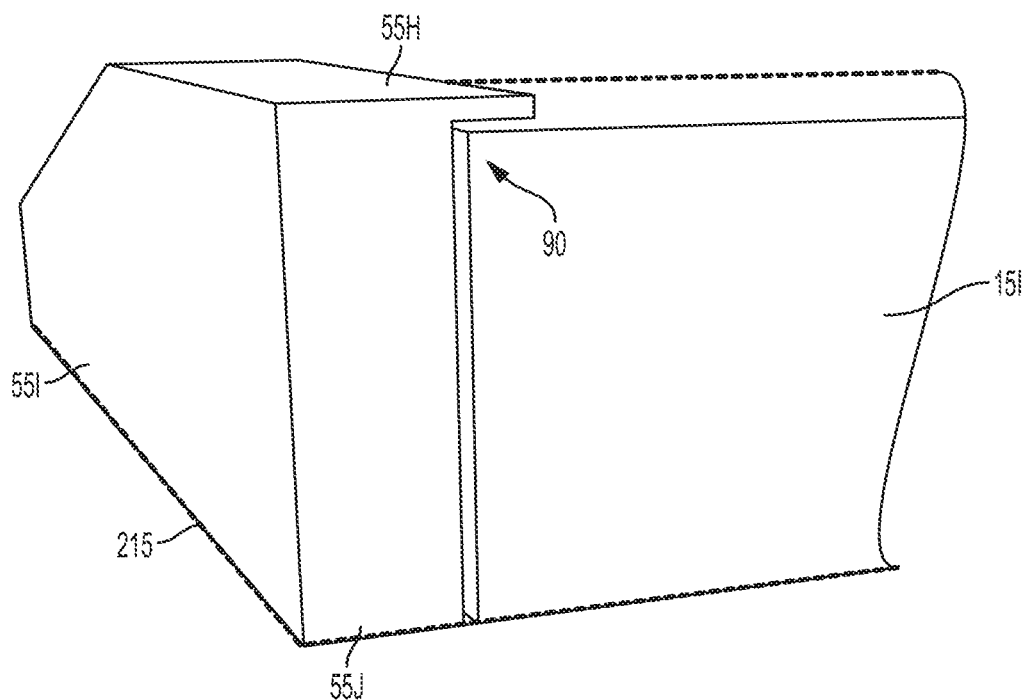
FIG. 5 is a side view of a section of the masking assembly of FIG. 4 showing the masking assembly overlapping the specimen.
Figure 7:
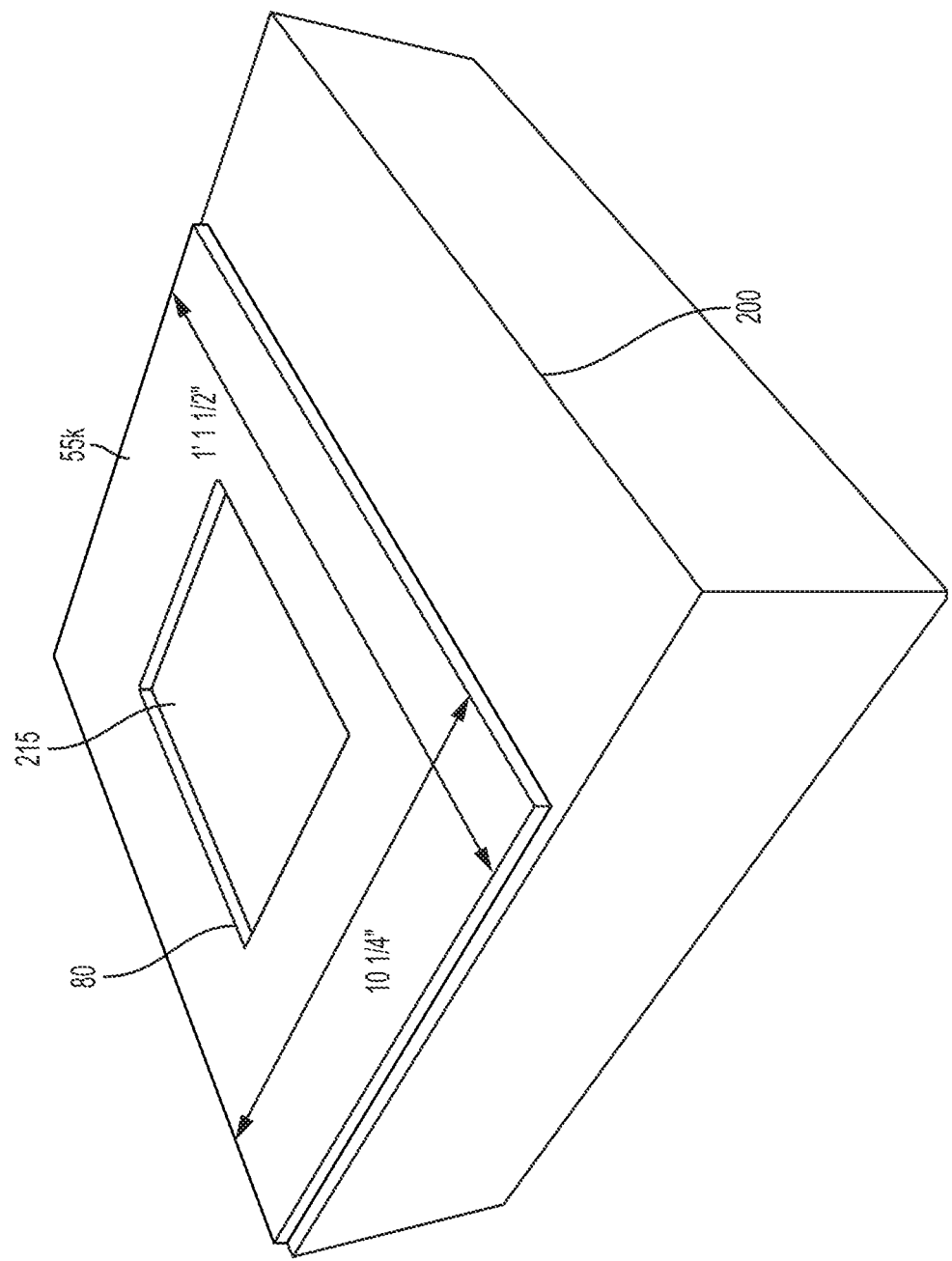
FIG. 7 is a plan view of an imaging surface surrounded by a base mask according to the disclosure of this invention.

FIG. 4 illustrates one construction of a masking and radiation shielding apparatus as described herein. The masking apparatus (55) of FIG. 4 includes a highly precise fit between the exterior contours (15) of the specimen (10) and sections of radiation blocking material (55). Sections (55) of radiation blocking material are connected to define a specimen holding frame (60) and an imaging window (80) within the specimen holding frame. The imaging window 80 exposes the specimen and can be located in any position that aids the imaging process and the specimen receipt of radiation thereon. The sections of radiation blocking material (55) further define an interior region that is so dimensioned to receive the exterior contours (15A, 15B, 15C, 15D) of the specimen (10) against internal faces (55B) of the holding frame, with at least a portion of the specimen visible through the imaging window (80). The faces of the holding frame are designed to fit against the exact shape of corresponding portions of the specimen (10) to avoid gaps between the sections of radiation blocking material and the specimen. A tight tolerance for the fit between the holding frame (60) and the specimen (10) prevents unwanted energy levels reflecting and diffracting within the holding frame (60) and causing noise in a resulting image. In one embodiment, the faces (55) of the holding frame (60) define an angle (90) at which the holding frame (60) of radiation blocking material extends over an exterior portion of the specimen to further alleviate any gaps between the holding frame (60) and the specimen. The gaps in this region allow unwanted traps for radiation to affect image quality, and positioning the holding frame (60) over an edge of the specimen reduces the problems associated with trapping radiation in the gap. FIG. 7 illustrates that additional masking regions (55k) may be added to the imaging surface (20) to define an imaging surface (215) of a digital radiological imaging assembly (200) that is also surrounded by a mask (55k) to further eliminate gaps and voids therein. The physical relationship between the imaging surface (215) and the specimen (10) may be determined by the position of an imaging window (80) exposing the specimen and the imaging surface (215) of the imaging apparatus receiving a desired wavelength of radiation through the specimen and onto or into the imaging device. In one embodiment, the imaging surface (215) has a define level of radiation transmission through the imaging surface and onto an image detector or array associated with the imaging surface. The imaging window that exposes the specimen to radiation may also be defined in part as exposing the specimen to the imaging surface if desired. In other words, this disclosure expressly covers arrangements in which the holding frame (60) masks every surface of the specimen, including the surface receiving radiation from the source as well as a different surface that is most proximate to the imaging surface of an imaging radiation detector or digital array.

In one embodiment, the masking assembly described herein may be made of high density radiation blocking materials, such as lead, but possibly titanium or tungsten, depending on the application. The higher density materials can be selected for the use at hand.

Figure 6:
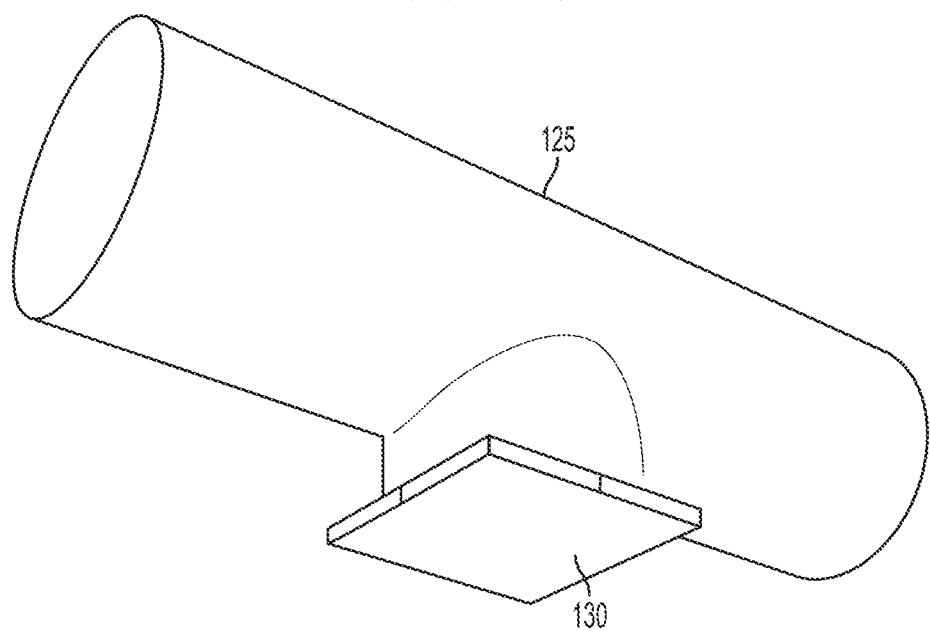
FIG. 6 is a perspective view of a radiation source for use with radiological imaging and a filter used with the radiation source.

The materials of the holding frame (60) that encloses voids between the specimen, the masking apparatus (55), and the imaging surface (20) may be selected in conjunction with the wavelengths and power profile of the radiation source (125). In one non-limiting embodiment, the radiation source is an X-Ray tube, but the use of X-rays is not the only radiation applicable to this disclosure. Source frequencies and power levels may be varied for the uses at hand. The filter (130) between the radiation source (125) and the specimen (10) is also a component that can be designed to minimize lower energy level radiation (prone to trapping as discussed above). For applications that achieve better results with high energy radiation, the filter can be designed with a thickness that absorbs the lower power components of the energy spectrum. In this embodiment, the thickness of the filter (135) and the material of the filter (whether lead or other metals) can be optimized for use with a masking assembly set forth in the earlier description. FIG. 6 shows the filtering operation at the source (125) of the radiation directed to a specimen (10), but the position is for example only and is not considered limiting of this disclosure. The filter (130) could be positioned at any place within the path of source radiation directed to the specimen, and this position includes, but is not limited to, being attached closely to the source (125) of radiation as shown in FIG. 6, being attached to or closer to the specimen (10) and shielding (60), or being attached to or closer to any structure there between so long as the radiation path is properly unobstructed and reaches the specimen within desirable parameters (e.g., the proper magnitude, frequency, and wavelength).

In one embodiment, the filter (130) may be a high resolution x-ray bandpass attenuator. This bandpass attenuator may be thicker than commonly used x-ray filter equipment, but additional attenuation of the radiation wave may be allowable so long as the ultimate imaging sensitivity is realized at the imaging surface (20). In other words, the thickness or other filtering capacity of the filter (130) that assists in controlling the radiation reaching the specimen may allow less overall radiation to reach the specimen but the frequency and wavelength of the radiation at the specimen produces less scattering at the imaging surface. This disclosure, therefore, incorporates a concept and method of maximizing imaging quality at a given imaging array resolution at the imaging surface (20) by engineering the source of radiation, the radiation parameters (e.g., magnitude, wavelength, frequency) with filters (130) of variable capacity to filter out certain instances of source radiation.

The embodiments of this disclosure are readily used with overall systems that direct radiation energy through a specimen (10) for contact with an imaging surface (20). The imaging surface may be part of a direct digital array that is tuned to image those incident radiation frequencies that pass through the specimen at the appropriate power level and wavelength. The technology of the source of radiation and the imaging equipment such as a digital array is not discussed in detail but includes all of the hardware, software, and imaging modules known in the industry. These kinds of imaging devices utilize specialized computer readable memory in conjunction with processors and associated electronics to provide appropriate radiological images used herein. An example of an imaging array that may be used as an imaging surface for radiation imaging operations includes by example, but is not limited to, scintillating screens with electronic devices such as charge-coupled devices (CCDs), thin-film transistors (TFT), complementary metal oxide semiconductor (CMOS), and similar kinds of digital electronics and switches that produce an electronic output in the presence of radiation that has been attenuated through a specimen. For example, and without limiting this disclosure to any one embodiment, imaging apparatuses include flat panel imagers that have been introduced for general radiography, dental, mammography and non-destructive testing (NDT) applications. Large-area CMOS active-pixel sensors (APS) in combination with scintillation films has been widely used in this technology.

Figure 8A:
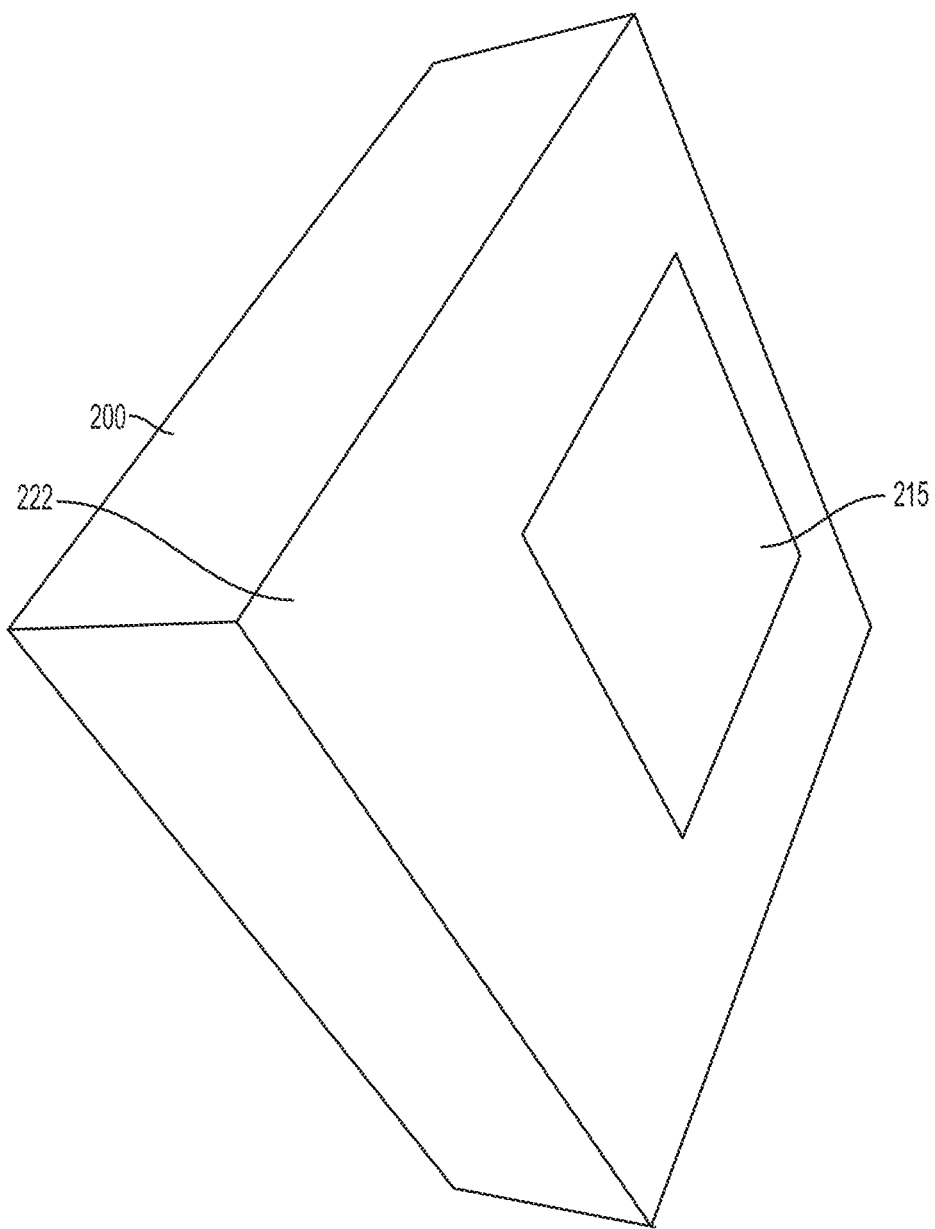
FIG. 8A is a plan view of an imaging surface and an associated housing without any shielding construction or mask thereon according to the disclosure of this invention.
Figure 8B:
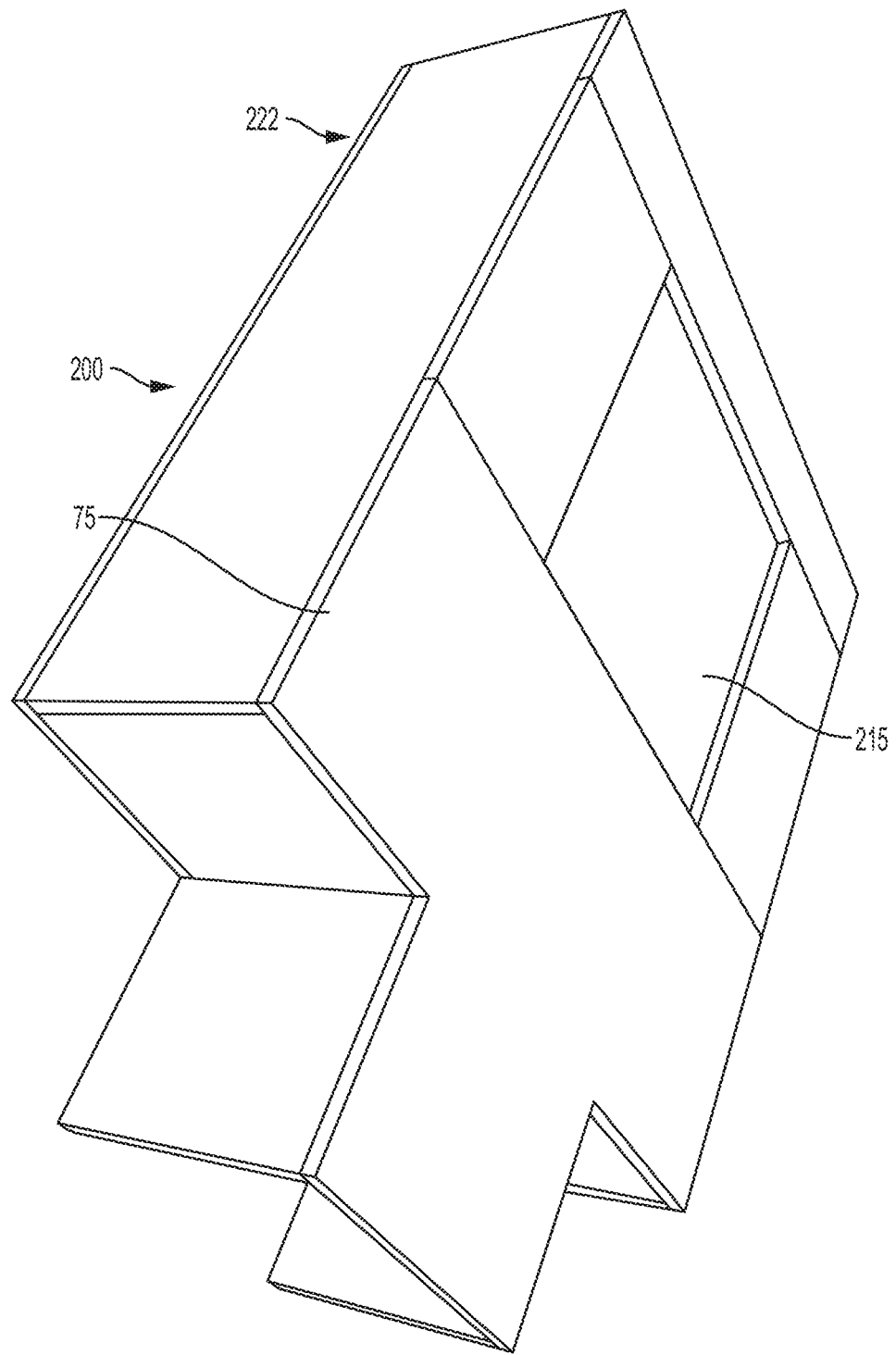
FIG. 8B is a plan view of the imaging surface of FIG. 8A and an associated housing covered by a fully enveloping shielding construction mask thereon according to the disclosure of this invention.

FIGS. 8A and 8B show before and after embodiments of an imaging apparatus (200) that incorporates the above described radiation detector array responsive to receipt of radiation at particular frequencies via a specimen (10) on an imaging surface (215). The imaging apparatus (200) incorporates the detector array, imaging surface, and associated electronics within a housing (222) that may are may not have filtering properties. In the image of FIG. 8A, the housing is unshielded with any kind of shield or mask as described herein. In one example, superior results have been noticed in systems that also provide full radiation shielding (75) around the entire housing of the imaging apparatus, particularly any housing enclosing the imaging surface. FIG. 8B shows that full shielding (75) around the imaging apparatus (200) and its housing (222) may be used in conjunction with any of the above described embodiments that would incorporate the holding frame (60) of masking material that blocks particular portions of radiation that is incident on the specimen to minimize scattering, reflection, refraction, and diffusion of the radiation at the specimen.

In one embodiment the imaging apparatus (200) is a digital detector array (DDA). In one embodiment used for testing, and in no way limiting the disclosure to any particular dimensions, one of the DDA-panels dimensions may be about 14"×14" square and about 5" thickness. One goal of this disclosure is to show that extremely thick specimens requiring extended exposure times may be able to achieve usable imaging according to this disclosure when prior art devices had thicknesses, filters, and specimen-masking that have been insufficient in the prior art. One factor disclosed herein lies in shielding the entire imaging apparatus (200), including the housing (222) from radiation. Nothing herein should limit covering even the imaging surface with either a filter or a section of radiation blocking material so long as a desired radiation permeability is achieved for suitable imaging resolution. In the example of FIGS. 8A and 8B, a 14"×14" top surface of the imaging apparatus (200) is a black square in the center, that square has dimensions of 10"×12". The only location of the detectors (i.e., the array) is directly underneath the black area, the imaging surface (222) of FIG. 8, although, scatter radiation will disrupt and saturate the detectors if the entire top surface of the housing (222) and possibly even the imaging surfaced (222) is not properly shielded with a high-density mask. If the specimen is substantially thick or dense and exposure times get very long, additional masking along the sides and bottom are also necessary to achieve a clean radiographic image with absolute minimum scatter. The DDA-panel exhibits zero inherent shielding from scatter radiation.

The system may have additional features/functionality. For example, the system may include additional storage (removable and/or non-removable) including, but not limited to, magnetic or optical disks or tape. The system typically includes a variety of computer readable media. Computer readable media can be any available media that can be accessed by the system and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory, removable storage, and non-removable storage are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the system. Any such computer storage media may be part of the system.

The system may also contain communications connection(s) that allow the device to communicate with other devices. Communications connection(s) is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

The system may also have input device(s) such as keyboard, mouse, pen, voice input device, touch input device, etc. Output device(s) such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described previously. Rather, the specific features and acts described previously are disclosed as example forms of implementing the claims.

This disclosure includes all electronics, computers, processors, and associated memory that would be used to implement an imaging system as shown herein.

Unless defined otherwise, all technical and scientific terms used herein have the same meaning as commonly understood by one of ordinary skill in the art. Methods and materials similar or equivalent to those described herein can be used in the practice or testing of the present disclosure. As used in the specification, and in the appended claims, the singular forms "a," "an," "the" include plural referents unless the context clearly dictates otherwise. The term "comprising" and variations thereof as used herein is used synonymously with the term "including" and variations thereof and are open, non-limiting terms. While implementations will be described for steering wheel hand detection systems, it will become evident to those skilled in the art that the implementations are not limited thereto.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the sensing system for a steering wheel as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting or layering arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present embodiments.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

These and other embodiments supported by the disclosure herein are set forth in the claims that follow this detailed description.

The invention claimed is:

1. A masking assembly for partially masking a specimen that is subject to radiation imaging, comprising:
    sections of radiation blocking material connected to define a specimen holding frame and a single imaging window within the specimen holding, frame exposing the specimen to the radiation;
    wherein the sections of radiation blocking material further define an interior region that is so dimensioned to receive exterior contours of the specimen against internal faces of the holding frame,
    wherein the internal faces of the holding frame are separate from other faces of the holding frame defining the imaging window, and
    wherein at least a portion of the specimen is visible through the imaging window.

2. A masking assembly according to claim 1, wherein the internal faces of the sections track at least one profile of the specimen, the faces defining at least one void between at least one surface of the specimen and the masking assembly.

3. A masking assembly according to claim 2, wherein the internal faces connect to the exterior contours of the specimen to define a gap that is within a tolerance measurement.

4. A masking assembly according to claim 2, wherein the internal faces connect at an angle configured to be open toward the interior region and so dimensioned to receive the specimen within the angle.

5. A masking assembly according to claim 1, wherein the internal faces are configured to extend over a portion of the exterior contours of the specimen.

6. A system for imaging a specimen with radiation, the system comprising:
    a source of radiation to be directed to the specimen;
    a filter between the source of radiation and the specimen to attenuate the radiation to a preferred power and wavelength;
    a masking assembly for partially masking the specimen, the masking assembly comprising:
    sections of radiation blocking material connected to define a specimen holding frame and an imaging window within the specimen holding frame,
    wherein the sections of radiation blocking material further define an interior region that is so dimensioned to receive exterior contours of the specimen against internal faces of the holding frame,
    wherein the internal faces of the holding frame are separate from other faces of the holding frame defining the imaging window, and
    wherein at least a portion of the specimen is visible through the imaging window.

7. A system according to claim 6, further comprising a digital imaging device comprising an imaging surface configured to receive the specimen surrounded by the masking assembly thereon,
    wherein the internal faces of the sections track at least one profile of the specimen, the faces enclosing at least one void between at least one surface of the specimen, the masking assembly, and the digital imaging device.

8. A system according to claim 7, wherein the digital imaging device further comprises a direct digital array receiving the radiation from the source, wherein the radiation traverses the imaging window of the masking assembly, the specimen, and is exposed to an imaging surface of the direct digital array.

9. A system according to claim 7, wherein the filter, the masking assembly, and the digital imaging device are configured to utilize the lowest power level of the radiation source to achieve an image of the specimen.

10. A method of masking a specimen for radiation imaging, comprising:
    attaching sections of radiation blocking material to one another such that the connected sections define a specimen holding frame and an imaging window within the specimen holding frame,
    arranging the sections of radiation blocking material to further define an interior region that is so dimensioned to receive exterior contours of a specimen against internal faces of the holding frame,
    wherein the internal faces of the holding frame are separate from other faces of the holding frame defining the imaging window, and
    wherein at least a portion of the specimen is visible through the imaging window.

11. A method according to claim 10, wherein the internal faces of the sections track at least one profile of the specimen, the faces defining at least one void between at least one surface of the specimen and the masking assembly.

12. A method according to claim 10, wherein the internal faces connect to the exterior contours of the specimen to define a gap that is within a tolerance measurement.

13. A method according to claim 10, wherein the internal faces define at least one angle that overlaps the specimen.

14. A method according to claim 10, further comprising dimensioning the masking assembly such that upon placing the specimen and the masking assembly on an imaging surface, the arrangement of the masking assembly, the imaging surface, and the exterior surfaces of the specimen enclose at least one void defined by the arrangement.

15. The system according to claim 6, further comprising additional sections of radiation blocking material that eliminate the imaging window, wherein the specimen is surrounded by radiation blocking material.

16. The system according to claim 15, wherein the holding frame blocks particular portions of radiation and is permeable to desired portions of radiation necessary for imaging.

* * * * *